(12) United States Patent
Nowak et al.

(10) Patent No.: US 9,089,927 B2
(45) Date of Patent: Jul. 28, 2015

(54) LASER PULSE GENERATION METHOD AND APPARATUS

(75) Inventors: Krzysztof Michal Nowak, Oyama (JP);
Howard John Baker, Edinburgh (GB);
Roy McBride, Lochgelly (GB); Jozef Jacek Wendland, Dalgety Bay (GB)

(73) Assignee: POWERPHOTONIC, LTD. (GB)

( * ) Notice: Subject to any disclaimer, the term of this patent is extended or adjusted under 35 U.S.C. 154(b) by 718 days.

(21) Appl. No.: 13/301,927

(22) Filed: Nov. 22, 2011

(65) Prior Publication Data
US 2012/0298650 A1 Nov. 29, 2012

(30) Foreign Application Priority Data

Nov. 30, 2010 (GB) .................................. 1020246.3

(51) Int. Cl.
| | |
|---|---|
| F27D 11/00 | (2006.01) |
| B23K 26/03 | (2006.01) |
| B23K 26/06 | (2014.01) |
| B23K 26/067 | (2006.01) |
| B23K 26/08 | (2014.01) |
| G02F 1/11 | (2006.01) |
| H01S 3/00 | (2006.01) |

(52) U.S. Cl.
CPC ............... B23K 26/03 (2013.01); B23K 26/063 (2013.01); B23K 26/067 (2013.01); B23K 26/0807 (2013.01); G02F 1/113 (2013.01); H01S 3/005 (2013.01); H01S 3/0085 (2013.01)

(58) Field of Classification Search
CPC .... B23K 26/03; B23K 26/063; B23K 26/067; B23K 26/0807; G02F 1/113; H01S 3/005; H01S 3/0085
See application file for complete search history.

(56) References Cited

U.S. PATENT DOCUMENTS

| | | | |
|---|---|---|---|
| 4,277,146 A | 7/1981 | Morgan | |
| 4,947,047 A | 8/1990 | Muraki | |
| 4,949,345 A | 8/1990 | Luijtjes | |
| 2002/0153362 A1 | 10/2002 | Sandstrom | |
| 2005/0270631 A1 | 12/2005 | Johnson | |
| 2007/0053391 A1 * | 3/2007 | Oron et al. ................. | 372/29.01 |
| 2008/0240184 A1 | 10/2008 | Cho | |
| 2011/0061810 A1 * | 3/2011 | Ganguly et al. ......... | 156/345.27 |

FOREIGN PATENT DOCUMENTS

JP    6142953    5/1994

* cited by examiner

*Primary Examiner* — Shawntina Fuqua
(74) *Attorney, Agent, or Firm* — Law Office of Jesse D. Lambert, LLC

(57) ABSTRACT

A method and apparatus of generating a laser pulse of a desired energy and micro-machining a substrate using the laser pulse. A beam of light is provided from a laser source. The beam is directed via a modulator to produce an output laser pulse with a portion of the laser pulse being used to determine the energy of the laser pulse. The modulator is controlled so as to switch off the output laser pulse when the determined energy of the output laser pulse reaches a threshold value. The output laser pulse is steered to a substrate for micro-machining.

16 Claims, 4 Drawing Sheets

LASER PULSE GENERATION METHOD AND APPARATUS

FIELD OF THE INVENTION

The present invention relates to a method and an apparatus for generating a pulsed laser beam. In particular a method of, and an apparatus for, generating laser pulses of desired energy, and optionally stabilising the wavelength spectrum, and beam pointing of each laser pulse.

BACKGROUND OF THE INVENTION

Lasers are widely used for the purposes of precision fabrication, such as the micromachining of metals, ceramics, crystals and glasses. In many laser micromachining applications, pulsed lasers are used to remove a controlled amount of material with each pulse. In particular, by varying the location and energy of each delivered pulse, a net shape can be generated.

The accuracy of net shape generation by pulsed laser precision micromachining, for example the fabrication of micro-optics in fused silica, depends on the accuracy and stability of the energy of the delivered pulses. In such applications, material removal depth control typically needs to be ~0.5% or better, imposing a similar requirement on the accuracy and stability of pulse energy. Accuracy and stability of beam pointing are also critical, as beam pointing typically determines the location at which the laser spot is incident on the workpiece, which in turn affects the spatial distribution of material removed and hence the net shape generated. Spectral stability is also important since the source wavelength can directly affect the amount of material removed, and can also affect the properties of optical components in the system. In particular, when an acousto-optic modulator (AOM) is used to modulate pulse energy in a first-order diffracted beam, a change in source spectrum will lead to a change in diffraction angle and hence modify the spot landing position. This can lead to an elongated or misplaced laser spot on the workpiece, thereby affecting the net shape generated. This effect can, in principle, be avoided by taking the $0^{th}$ order beam as the output, but this has this disadvantage that due to the limited contrast of the AOM the output beam can never be switched fully off.

An additional consequence of using an AOM is that there is an additional, unwanted, component of beam deflection that varies with RF drive power. This results in an undesirable cross-coupling between AOM transmission, which is used to control pulse energy, and beam pointing, which affects where the laser spot lands on the workpiece.

Many continuous wave (CW) lasers exhibit temporal power fluctuations greater than 2%. Pulsed lasers typically exhibit pulse-to-pulse energy fluctuations of a similar magnitude.

Attempts to address these problems have been made. For example, closed loop control of the laser drive can reduce the pulse to pulse variability in pulse energy, but in many cases this technique does not provide sufficient pulse energy stability to achieve precision micromachining, and is difficult to implement in practice, since it often requires a more complex laser power supply. Also, this approach does not deal with fluctuations in laser spectrum and laser beam pointing.

US patent application publication US2005/0270631 A1 proposes the use of closed-loop control to generate output pulses of fixed energy from a laser source with fluctuating pulse energy. This approach calculates a modulator control signal for attenuation of a given pulse using measurements of previous output pulse energies. This closed-loop control approach requires a high degree of correlation of pulse energy from pulse to pulse, as it cannot correct for pulse energy fluctuations that are not temporally correlated.

U.S. Pat. No. 4,277,146 proposes a means for limiting the peak instantaneous power of an individual laser pulse, using a Pockels cell. This method only starts to attenuate the beam when it exceeds a preset threshold level, and does not affect the transmitted power as long as it remains below this threshold level. While this approach does control the maximum peak power of the beam for each individual pulse, it does not determine the output pulse energy. This approach requires closed-loop control of laser power within the individual pulse, and so requires a modulator whose response time is very much shorter than the laser pulsewidth. The stability of closed loop control systems is very sensitive to delay in the loop filter, and so while this approach is well-suited to use with fast modulators, such as the Pockels cell, it is less well-suited to use with modulators such as AOMs, where the time delay due to acoustic propagation is often significant on the timescale of the laser pulse.

US patent application publication US2005/0270631 A1 also proposes a means for stabilising laser beam pointing using two or more AOMs, or a compound AOM incorporating two orthogonal diffracting acoustic fields. This approach has the disadvantage that the use of multiple Bragg diffractions is expensive, complex, and reduces system efficiency. This approach also requires complex electronics to modulate AOM drive frequency as part of the control system, which increases system cost.

In one specific example, pulsed carbon dioxide (CO2) lasers are used to fabricate fused silica micro-optics by removing material from an initially flat fused silica blank, to generate a net surface shape with a specific optical function, for example a lens. In another example, continuous wave (CW) CO2 lasers have also been used to fabricate micro-optics.

A wavelength-stabilised CW CO2 laser may be amplitude modulated to generate pulses. However, while such a laser exhibits a stable spectrum, fairly low noise and fairly stable pointing, the high mean power through subsequent optical components can cause thermal lensing and the pulses may have inconveniently low peak power.

Alternatively, RF-excited pulsed CO2 lasers are lower cost, more robust and widely available, and may be configured to exhibit high peak power and low mean power. However, for applications such as laser precision micro-machining, such lasers exhibit an unstable spectrum, poor pulse-to-pulse energy repeatability and significant pulse-to-pulse beam pointing variation.

In both cases, the best external modulator is typically an AOM. However, it is know that varying the RF drive power to an AOM typically steers the beam, which can cause spot landing errors at the workpiece. Hence these approaches have a requirement for pulse energy stabilization, beam pointing control, spectral stabilisation.

It is therefore an object of at least one embodiment of the present invention to provide a method of generating a laser pulse that obviates and mitigates one or more of the disadvantages and limitations of the prior art.

Moreover, it is therefore an object of at least one embodiment of the present invention to provide an apparatus to generate a laser pulse that obviates and mitigates one or more of the disadvantages and limitations of the prior art.

SUMMARY OF THE INVENTION

According to a first aspect of the present invention, there is provided a method of generating a laser pulse of a desired energy, the method comprising the steps of:

(a) providing a beam of light from a laser source;
(b) directing the beam of light via a modulator, the modulator operable to modulate the beam to produce an output laser pulse;
(c) determining the energy of the output laser pulse; and
(d) controlling the modulator so as to switch off the output laser pulse when the determined energy of the output laser pulse reaches a threshold value.

In this way, the generation of and the desired energy of a single, delivered, pulse can be controlled. Furthermore, pulse energy can be controlled with high accuracy on a pulse-to-pulse basis, regardless of any fluctuations in power from the laser source. When used with a continuous wave (CW) laser source, the method produces output pulses of desired (i.e. at threshold) energy and eliminates laser intensity noise.

When used with a pulsed laser source, the method allows modification of an existing pulse (e.g. by truncating the pulse) to modify the total energy thereof.

Preferably, the step of determining the energy of the output laser pulse comprises redirecting a portion of the laser pulse to a detector and measuring the energy of the portion of the laser pulse.

Said portion may be redirected using a partial reflector and said detector may be an integrating detector (e.g. a pyroelectric detector) or detect instantaneous power for subsequent integration (e.g. in electronics).

Optionally, the method comprises the additional step of controlling the modulator so as to start the laser pulse at a predetermined time.

Controlling the start time of the laser pulse has particular advantages when used with a pulsed laser source. Said source laser pulses (i.e. from the pulsed laser source) tend to exhibit spectral instability at switch on. The start time can be set to as to effectively cut out an unstable start portion of a laser pulse.

Preferably, the method comprises the additional step of controlling the laser source.

Controlling the laser source allows an additional level of control over the generation of a laser pulse of desired energy.

Optionally, controlling the laser source comprises providing a laser control signal which causes the laser source to emit a predetermined source laser pulse.

When the laser source is controlled so as to emit a predetermined source laser pulse and the modulator is controlled so as to start the laser pulse at a predetermined time, a great deal of control over the timing and spectral stability of the laser pulse can be achieved, especially since the method may also allow for truncation of the source laser pulse to cut out the unstable end portion of the source laser pulse.

Preferably, the step of providing the beam of light from the laser source comprises providing the laser source with a laser control signal of a predetermined duration D1 to provide a source laser pulse of corresponding duration, as illustrated in FIG. 2.

Preferably, the step of modulating the beam comprises providing the modulator with a modulator control signal of a predetermined duration D3 corresponding to a desired output laser pulse duration, D3 being less than D1.

Preferably, there is a predetermined delay D2 between the laser control signal and the modulator control signal. Preferably D2+D3<D1. Preferably, D2 is selected such that the modulator control signal corresponds to a spectrally stable region of the source laser pulse.

Preferably, the step of controlling the modulator comprises controlling the duration D3 of the modulator control signal so as to switch off the output laser pulse when the determined output laser pulse energy reaches the threshold value.

Optionally, the method further comprises the step of redirecting a portion of the output laser pulse to a position sensing detector.

Preferably, the method further comprises the step of controlling a beam steering mirror responsive to an output signal from the position sensing detector.

A closed loop control system can therefore be implemented that ensures a desired beam direction is continuously maintained.

Optionally, the method further comprises the step of controlling the cavity length of the laser source.

Preferably, the cavity length is controlled by controlling a mean temperature of the laser source.

Controlling the cavity length, for example by controlling a mean temperature of the laser source, can be used to maintain the laser at a required operating wavelength. Other methods of controlling cavity length can of course be employed.

Preferably, the step of controlling the mean temperature of the laser source comprises cooling the laser source to set a nominal temperature and subsequently heating the laser source.

Preferably, the mean laser source temperature is monitored using one or more temperature sensors.

Preferably, the mean temperature of the laser source is controlled responsive to deviation of a measured laser source power or pulse energy from a predetermined desired laser source power or pulse energy.

A plot of power versus mean temperature of the laser source provides a signature or profile demonstrating variation as a function of temperature which is quasi-cyclic (see FIG. 6 for example). Accordingly, increased spectral stability can be achieved by monitoring the ratio of laser pulse width to power, so as to lock the laser to a specific point on the said signature or profile by controlling the temperature in response to fluctuations in the measured output power.

According to a second aspect of the present invention, there is provided a method of micro-machining a substrate comprising generating a laser pulse of a desired energy using the method of the first aspect, and steering said laser pulse to the substrate to be micro-machined.

The present invention finds particular utility in laser micro-machining applications where control of laser pulse energy on a pulse-by-pulse basis is highly desirable. Particular embodiments according to the method of the first aspect also have advantages in terms of spectral stability, spectral control and beam pointing stability, each of which are also highly desirable in laser micro-machining applications.

According to a third aspect of the present invention, there is provided an apparatus to generate a laser pulse of a desired energy, the apparatus comprising:
 a laser to provide a beam of light;
 a modulator to modulate the beam of light and produce an output laser pulse;
 a controller configured to control the modulator; and
 a detector to determine the energy of the output laser pulse and provide a corresponding signal to the controller;
 wherein the controller is configured to cause the modulator to switch off the output laser pulse when the signal indicates that the determined energy of the output laser pulse has reached a threshold value.

The apparatus generates a laser pulse of a desired energy by switching off the pulse when the threshold energy level is reached. Pulse energy can therefore be controlled on a pulse-by-pulse basis, regardless of (or indeed responsive to) any fluctuations in power from the laser source.

The laser may be pulsed or CW. When used with a CW laser, the method produces output pulses of desired (i.e. at threshold) energy and eliminates laser intensity noise. When used with a pulsed laser source, the method further allows modification of an existing pulse (e.g. by truncating the pulse) to modify the total energy thereof.

Preferably, the modulator comprises an acousto optic modulator. Alternatively, the modulator comprises an electro optic modulator. Further alternatively the modulator comprises a Pockels cell and a polariser.

Any modulator effective to produce an amplitude modulation in an output beam shall be suitable to implement the present invention. An acousto optic modulator or a tiltable mirror does so by controllably deflecting the incoming beam; the electro optic modulator by, for example, directly modulating amplitude; and the Pockels cell by rotating polarisation to switch between transmission and extinction at the polariser.

Preferably, the apparatus comprises one or more optical components arranged to redirect a portion of the output laser pulse to the detector.

Optionally the one or more optical components comprise a partial reflector. Optionally, the detector is an integrating detector. Alternatively, the detector detects instantaneous power and the controller is configured to integrate the instantaneous power to determine pulse energy.

Preferably, the controller is configured to output a modulator control signal to the modulator so as to start the output laser pulse at a predetermined time.

Preferably, the controller is further configured to output a laser control signal to the laser so as to emit a predetermined source laser pulse.

Preferably, the laser control signal has a predetermined duration D1 to provide a source laser pulse of corresponding duration.

Preferably, the controller is configured to output a modulator control signal of a predetermined duration D3 corresponding to a desired output laser pulse duration, D3 being less than D1.

Preferably, there is a predetermined delay D2 between the laser control signal and the modulator control signal. Preferably D2+D3<D1. Preferably, D2 is selected such that the modulator control signal corresponds to a spectrally stable region of the source laser pulse.

Preferably, the controller is configured to control the duration D3 of the modulator control signal so as to switch off the output laser pulse when the determined output laser pulse energy reaches the threshold value.

Optionally, the apparatus further comprises a position sensing detector and one or more optical components to redirect a portion of the output laser pulse to the position sensing detector.

Preferably, the apparatus further comprises a beam steering mirror controlled in response to an output signal from the position sensing detector.

Optionally, the apparatus further comprises a temperature control system configured to control a mean temperature of the laser source.

Preferably, the temperature control system comprises a chiller to set a nominal temperature and a heater to subsequent heat the laser source.

Optionally, the heater comprises heater tape. Preferably, the temperature control system further comprises one or more temperature sensors.

Preferably, the temperature control system is configured to control the mean temperature of the laser source responsive to deviation of a measured output laser pulse power from a predetermined desired output laser pulse power.

According to a fourth aspect of the present invention, there is provided an apparatus for micro-machining a substrate comprising an apparatus of the third aspect which generates a laser pulse of a desired energy, and one or more optical components arranged to steer the laser pulse to the substrate to be micro-machined.

Preferably, the apparatus further comprises an X-Y translation stage to receive and translate the substrate relative to the apparatus.

Optionally, the X-Y translation stage provides a signal corresponding to a position of the substrate to the controller and the controller is configured to generate one or more output laser pulses responsive to the position dependent signal.

Preferably, the apparatus further comprises a focussing lens and a Z translation stage to translate the focussing lens to allow focussing of the laser pulse onto the substrate.

BRIEF DESCRIPTION OF THE FIGURES

The present invention will now be described by way of example only and with reference to the accompanying figures in which.

DETAILED DESCRIPTION OF THE INVENTION

Figure 1:
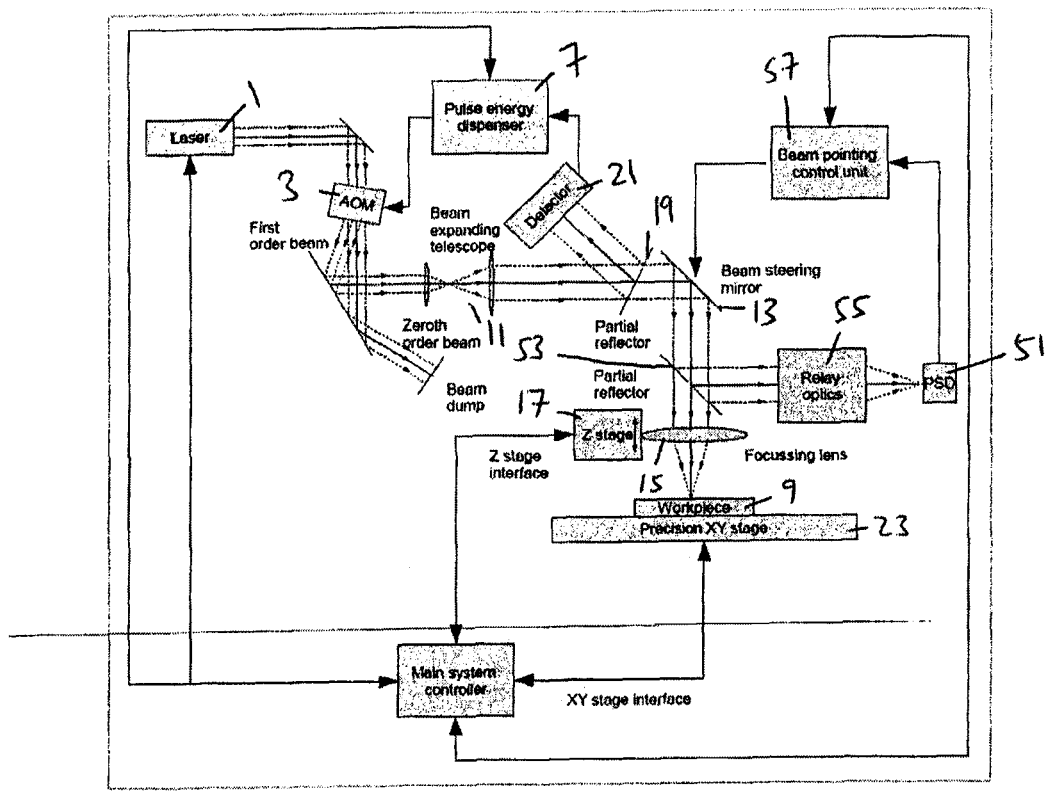
FIG. 1 illustrates in schematic form an overview of a precision micro-machining apparatus in accordance with an aspect of the present invention.

With reference to FIG. 1, there is presented an overview of a precision micro-machining apparatus that functions to micro-machine a substrate (or workpiece) as described in detail below. The apparatus can be seen to comprise a laser 1 (for the sake of this example an RF excited $CO_2$ laser) the output light beam of which is directed through an acousto optic modulator (AOM) 3. The AOM 3 nominally directs the (zeroth order) beam to a beam dump 5.

The AOM 3 is controlled by a controller (or "pulse energy disperser") 7 which selectively drives the AOM 3 so as to controllably direct the beam towards the substrate 9. By fast switching of the AOM 3, pulses of laser light can be sent to the substrate 9. Note that (in this embodiment) the first order (transmitted) beam is passed through a beam expanding telescope 11 onto a beam steering mirror 13 which controls the direction of the beam impinging on the substrate 9. A focussing lens 15, translated by translation stage 17, allows the beam to be focussed onto the substrate 9.

Typically the spot on the substrate 9 corresponds to a Gaussian beam waist such that the spot profile at the surface to be machined is circular Gaussian. The beam radius may be on the order of approximately 25 μm. (Of course different beam radii and profiles, e.g. elliptical spots, can be employed depending on the application).

The level of the z-stage 17 is controlled and set to ensure the correct (or desired) focus or of the beam at the substrate 9. Typically this is done to set the beam waist on, or below, the surface of the substrate 9 to be machined, but it may be used to set the beam waist at any required level.

Figure 4:
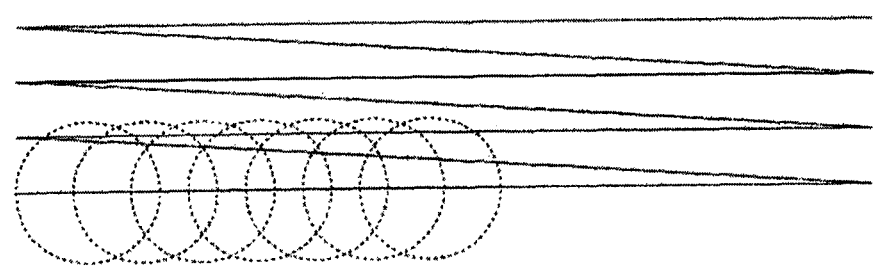
FIG. 4 illustrates a raster cutting pattern such as may be employed in a micro-machining process.

The substrate 9 (typically a piece of flat, parallel-sided fused silica 1 mm thick) is located on a precision XY stage 23 and is machined according to a predetermined pattern by translating the substrate 9 in a raster pattern (see FIG. 4 for example) and directing appropriate laser pulses onto the substrate 9 at several locations during the raster scan. The following paragraphs describe how the laser pulses are controlled in order to provide the correct amount of energy in each pulse, a knock-on effect of which is that a fixed raster can be used.

A partial reflector 19 is located between the beam expanding telescope 11 and the beam steering mirror 13. The partial reflector 19 (e.g. beamsplitter or the like) diverts a portion of the beam onto a detector 21. In a preferred embodiment the detector is a pyroelectric detector but of course may be any integrating detector. Alternatively, the detector may measure instantaneous power for subsequent integration (e.g. by the controller 7). In this way, the total energy of a pulse produced by switching of the AOM 3 can be determined.

Figure 2:
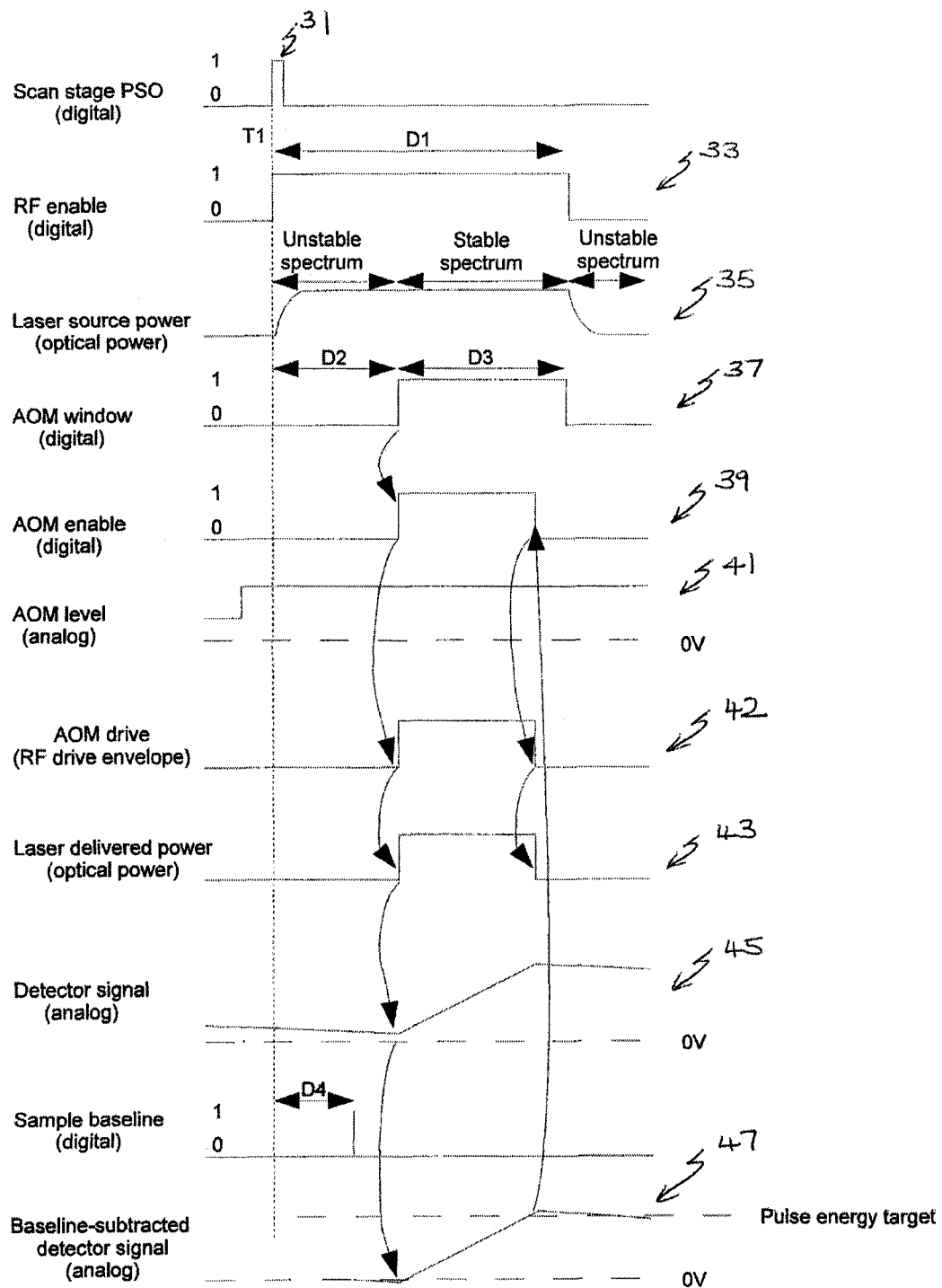
FIG. 2 is a signal diagram showing signals corresponding to the generation of a single laser pulse.

At time T1 (see FIG. 2) the leading edge of the Position-synchronised output (PSO) pulse triggers "RF enable" 33, which drives the laser with a radio frequency pulse of fixed period D1. Typically this pulse duration will be on the order of 100-200 μs.

After a short delay (D2) the controller drives the AOM 3 with a signal as illustrated by trace 37 which causes a "window" to open at time T1+D2. This results in a transmitted laser pulse which begins at a predetermined time. Of course the delay could in theory be zero, in which case the AOM 3 is synchronised with the laser and simply transmits the laser pulse. If the delay is set appropriately however the initial power ramp can be chopped out, resulting in a square leading edge (intensity/power) in the transmitted pulse.

Note that the AOM analog level (see trace 41) is set before the AOM window (see trace 37) opens. When the AOM window opens, the AOM enable signal 39 is set, and RF drive power 42 is applied to the AOM with signal level determined by AOM level 41 and RF pulse timing determined by AOM enable 39. This enables the AOM 3, which then passes light into the first order beam (the "transmitted beam") with transmission level determined by the AOM level. The laser power transmitted into the first order beam (and then onto the steering optics and ultimately the substrate) is the product of the transmission fraction and the laser power incident on the AOM.

Figure 3:
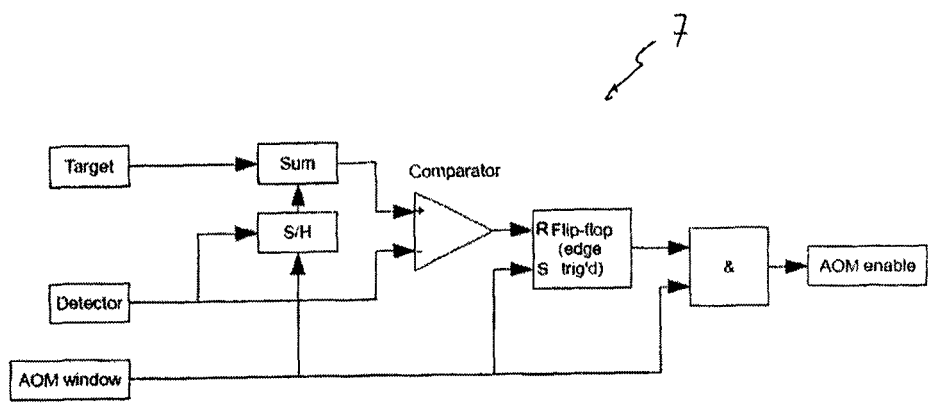
FIG. 3 illustrates in schematic form a controller for controlling the generation of a laser pulse of desired energy in accordance with an aspect of the present invention.

As above, a portion of the transmitted beam is directed onto the detector 21. The detector signal is shown on trace 45, for the case of an integrating, self-resetting detector, for example a pyroelectric detector with a resistive load. The signal from a self-resetting detector at time T1+D2 may contain a small remnant of the signal from the previous pulse. In this case, a baseline reference is taken at time T1+D4 and subtracted from the detector signal trace 45, resulting in the baseline-subtracted detector signal shown in trace 47, which indicates the total energy of the pulse as a function of elapsed time, and is the integral of the laser power indicated on trace 43. Once the total energy reaches a threshold value ("pulse energy target") the AOM enable signal (see trace 39) is reset which results in the laser output being stopped (see trace 43). In this way, the controller 7 (FIG. 3 illustrates an exemplary controller or "pulse energy dispenser") ensures that every pulse has the correct energy. Not only may the pulse energy be set on a pulse to pulse basis, but by monitoring total energy each pulse can have the correct energy regardless of any fluctuations etc. in the output of the laser itself (i.e. if laser power falls then pulse duration is extended and if laser power increases then pulse duration is shortened—and any fluctuations during the time of the pulse itself will not affect the total output energy).

Where an integrating detector with an active reset is used, then this detector may be reset at time T1+D4. This is equivalent to baseline subtraction, and trace 47 is then the output signal from such an integrating detector. Similarly when a power-measuring detector with a separate actively-reset integrating circuit is used, this subsystem is effectively an integrating detector with an active reset and is therefore treated in the same way.

As illustrated by trace 35, during the generation of a laser pulse the laser output power ramps up rapidly (e.g. on the order of ~10 μs), then settles at a near-constant level. It is noted, experimentally, that even after the power has settled (say 20 μs after the RF is switched on), the spectrum will not necessarily have settled. The spectrum in this example has settled sufficiently after delay D2.

Furthermore, when the RF signal driving the laser is switched off at time T1+D1, laser power then drops rapidly and the spectrum again changes rapidly. Therefore the end of the source laser pulse (again see trace 35) also exhibits spectral instability.

The present invention therefore has added utility in that by selecting the delay and laser pulse duration appropriately, spectrally unstable portions of the laser pulse may be removed. For example, the delay D2 in the illustrated example has been selected such that the spectrally unstable portion at the start of the source laser pulse 35 is removed. What constitutes an appropriate delay is preferably determined experimentally prior to operation, however it is envisaged that a spectral analyser may be employed to ensure spectrally stable pulses on a pulse to pulse basis.

The AOM "window" remains open for time D3, where D2+D3<~D1, so that the signal driving the laser is still on when the AOM "window" closes (or AOM window closes very soon after RF pulse off, but before the spectrum starts to change rapidly).

Note that if a self-resetting detector is used, it is desirable that the time constant of the detector gives low droop over the duration of a pulse but sufficient decay between consecutive pulses because residual decay over the duration of the next pulse will result in higher than desired pulse energies. In this case, it is preferable that baseline subtraction is used. However, small amounts of such carry-over may be tolerated and the skilled person would readily be able to compensate for such carry-over by appropriate modification of thresholds (or "pulse energy targets"). Carry-over may be minimised by setting the value of delay D4 close to D2. Any skilled person would also be able to compensate for droop in the detector signal over the duration of a pulse by adjusting the pulse energy target by an amount that can be calculated from the pulse length and the droop properties of the detector.

There will always be a finite delay between detecting that the pulse energy has reached its target value and fully switching off the laser pulse. Where this delay is significant, it can be compensated to first order by adjusting the pulse energy target by an amount related to the laser power (typically known to ~2%) and the delay. A 2% error on a small correction signal will often be acceptable. Where higher accuracy is required, an analogue or digital filter can be used to correct for this effect in the baseline-subtracted detector signal 47, for example by adding a component related to the rate of change of this signal, so that the threshold value is detected slightly earlier with the result that the final measured pulse energy is at the required value.

Note that (see FIG. 1 but also with reference to FIG. 2), the XY stage 23 (or an associated controller—not shown) may generate a PSO trigger (see trace 31 for example) when the stage reaches a predetermined location. This is a standard feature on many commercial XY stages and controllers. These trigger signals may therefore be used to initiate generation of the laser pulses, although it is envisaged that there will be several ways to decide when laser pulses should be generated. One such alternative would be to trigger on a time basis where the position of the stage is known or determined as a function of time.

The above technique means that the described apparatus can mitigate what could otherwise be a significant error in terms of pulse-to-pulse control. In the example of laser micromachining, such errors would manifest themselves in terms of deviations from a desired machined surface profile (more power removes more material, less power removes less material). For precision applications, such deviations can be catastrophic; at the very least problematic.

Other errors occur because of pointing errors; i.e. that the beam is not actually pointing in the direction expected. This produces errors in terms of the positions where craters are produced and therefore in the resulting net shape. The main problem is caused by low-frequency correlated pointing errors. High frequency uncorrelated errors are not a big problem, but still undesirable.

Actual measurements of beam pointing on a pulsed $CO_2$ laser demonstrates that the dominant errors have a 1/f spectrum i.e. low frequencies are dominant and shot-to-shot pointing is well correlated. This can lead to large cutting errors if not corrected.

The applicant has discovered that this type of error is handled well by a closed loop control system.

Part of the transmitted beam after the beam steering mirror 13 is picked off by another partial reflector 53 and directed through a system of relay optics 55 to a position-sensing detector 51 (PSD). The PSD 51 may, for example, be a pyroelectric quad cell, photodiode or other optical position sensor.

The relay optics 55 are configured to place a spot on the PSD 51 that is equivalent to the spot on the substrate 9; in that spot position on the PSD 51 is determined by spot position at the substrate 9.

The PSD signal is fed into a control unit 57, for example a discrete-time servo, which controls beam pointing via the beam steering mirror 13. An integral controller can be used. The applicant found that the best performance was achieved using a z-transform controller to implement a control loop with a double-integral component.

Further enhanced operation can be achieved by controlling the cavity length of the laser, which may be achieved by appropriate control of the temperature of relevant components (e.g. including the laser tube) within the laser resonator. The laser spectrum and the laser power vary quasi-cyclically with the laser resonator length when all other parameters are held constant.

Figure 5:
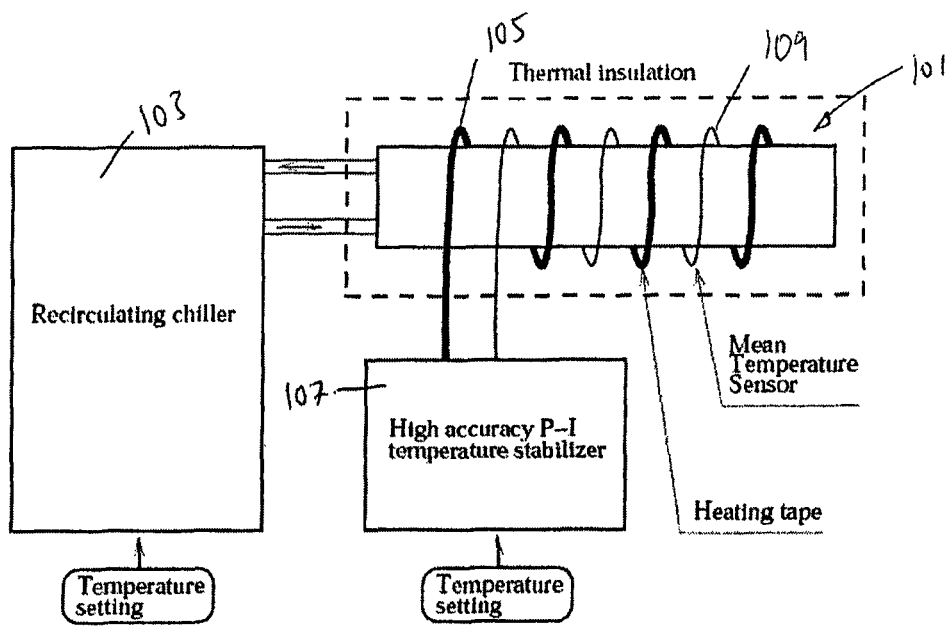
FIG. 5 illustrates in schematic form a laser temperature control system for use in one or more aspects of the present invention.

With reference to FIG. 5, the laser tube 101 is maintained at the approximately the required temperature to enable the required wavelength by using a recirculating chiller 103 to set a nominal laser temperature. Commercially-available chillers that can achieve coolant temperature stability of +/−0.1C are available, which is sufficient for a "coarse" temperature setting. The laser tube 101 may then be selectively heated from that nominal temperature by a heater, in this case heating tape 105 wound around the laser tube 101. A control system 107, in this example a high-accuracy proportional-integral (PI) temperature stabiliser, fine tunes the mean temperature of the laser tube (measured using a mean temperature sensor 109, which in this example is wound around the laser tube 101). This closed loop control allows the mean temperature to be set to any required value over the operating range. This combination of coarse and fine temperature control allows precise tuning of the laser cavity length over several cycles of the laser source signature.

Figure 6:
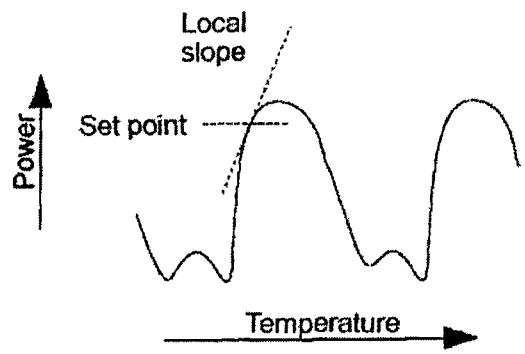
FIG. 6 illustrates the quasi-cyclic relationship between temperature and power of a laser taken advantage of in one or more embodiments of the present invention.

In and of itself, temperature stabilisation and/or control may not guarantee locking to a particular spectral line on the laser's spectral signature. Increased wavelength stability can be achieved in some cases by using the ratio of laser power to pulsewidth in order to lock the laser to a specific point on the signature. See FIG. 6. This can be achieved by running the laser at constant pulse-width and using the departure of measured power from set-point power to control the laser tube temperature, via a PI or other controller, as an extra layer of control on the above-mentioned laser tube temperature control approach. Alternatively it could be used to drive the tube heaters directly, replacing the fine temperature control loop with a control loop that directly controls position on the laser signature.

An alternative approach may use a closed loop control system to maintain constant laser power by varying pulse width, and then use the pulse width control signal to determine the position on the signature. Deviation of pulse width from the set-point value is the error signal used to drive the control system.

Throughout the specification, unless the context demands otherwise, the terms 'comprise' or 'include', or variations such as 'comprises' or 'comprising', 'includes' or 'including' will be understood to imply the inclusion of a stated integer or group of integers, but not the exclusion of any other integer or group of integers.

Further modifications and improvements may be added without departing from the scope of the invention herein described. For example, while some embodiments of the invention have been described in terms of a pulsed laser source, the invention is equally applicable to CW laser sources where, although the source is not pulsed, operation of the modulator clearly still provides a pulsed output. In addition, where an acousto optic modulator has been described the modulator could be an electro optic modulator, tiltable mirror, Pockels cell and polariser arrangement, or the like. Also, while some embodiments of the invention use translation stages to move a workpiece relative to the beam, a galvanometer scanner may alternatively be used to move the beam relative to the workpiece, or some combination of galvanometer scanner and translation stages can be used. Furthermore, although the present invention finds utility in machining and particularly in micromachining applications, it shall apply equally to applications in which it is desirable to control the energy or other properties of laser pulses.

We claim:

1. A method of generating a laser pulse of a desired energy, the method comprising the steps of:
   a) providing a beam of light from a laser source;
   b) directing the beam of light via a modulator, the modulator operable to modulate the beam to produce an output laser pulse;
   c) directing a portion of the output laser pulse to a detector and thereby determining the energy of the output laser pulse; and
   d) controlling the modulator so as to switch off the output laser pulse when the determined energy of the output laser pulse reaches a threshold value.

2. The method of claim 1, comprising the additional step of controlling the modulator so as to start the output laser pulse at a predetermined time.

3. The method of claim 1, further comprising the steps of
 a) providing the beam of light from the laser source by providing the laser source with a laser control signal of a predetermined duration D1 which causes the laser source to provide a source laser pulse of corresponding duration,
 b) modulating the beam by providing the modulator with a modulator control signal of a predetermined duration D3 corresponding to a desired output laser pulse duration, wherein D3 is less than D1, and
 c) providing a predetermined delay D2 between the laser control signal and the modulator control signal, wherein D2+D3<D1 and D2 is selected such that the modulator control signal corresponds to a spectrally stable region of the source laser pulse.

4. The method of claim 1, wherein the method further comprises the step of redirecting a portion of the output laser pulse to a position sensing detector and controlling a beam steering mirror responsive to an output signal from the position sensing detector.

5. The method of claim 1, wherein the method further comprises the step of controlling the cavity length of the laser source responsive to deviation of a measured output laser pulse power from a predetermined desired output laser pulse power.

6. A method of micro-machining a substrate comprising the steps of:
 a) providing a beam of light from a laser source;
 b) directing the beam of light via a modulator, the modulator operable to modulate the beam to produce an output laser pulse;
 c) directing a portion of the output laser pulse to a detector and thereby determining the energy of the output laser pulse; and
 d) controlling the modulator so as to switch off the output laser pulse when the determined energy of the output laser pulse reaches a threshold value; and
 e) steering said laser pulse to the substrate to be micro-machined.

7. An apparatus to generate a laser pulse of a desired energy, the apparatus comprising:
 a laser to provide a beam of light;
 a modulator to modulate the beam of light and produce an output laser pulse;
 a controller configured to control the modulator;
 an optical element to direct a portion of the beam to a detector; and
 a detector to determine the energy of the output laser pulse and provide a corresponding signal to the controller;
 wherein the controller is configured to cause the modulator to switch off the output laser pulse when the signal indicates that the determined energy of the output laser pulse has reached a threshold value.

8. The apparatus of claim 7, wherein the controller is configured to output:
 a modulator control signal to the modulator so as to start the output laser pulse at a predetermined time, D1;
 a laser control signal to the laser so as to emit a predetermined source laser pulse;
 a modulator control signal of a predetermined duration D3 corresponding to a desired output laser pulse duration, D3 being less than D1;
 wherein there is a predetermined delay D2 between the laser control signal and the modulator control signal, D2+D3<D1, and D2 is selected such that the modulator control signal corresponds to a spectrally stable region of the source laser pulse.

9. The apparatus of claim 7, wherein the apparatus further comprises a position sensing detector and one or more optical components to redirect a portion of the output laser pulse to the position sensing detector.

10. The apparatus of claim 7, wherein the apparatus further comprises a temperature control system configured to control a cavity length of the laser source.

11. The apparatus of claim 10, wherein the temperature control system is configured to control the cavity length of the laser source responsive to deviation of a measured output laser pulse power from a predetermined desired output laser pulse power.

12. The apparatus of claim 7, wherein the apparatus further comprises one or more optical components arranged to steer the laser pulse to a substrate to be micro-machined.

13. The apparatus of claim 12, wherein the apparatus further comprises an X-Y translation stage to receive and translate the substrate relative to the apparatus.

14. The apparatus of claim 13, wherein the X-Y translation stage provides a signal corresponding to a position of the substrate to the controller and the controller is configured to generate one or more output laser pulses responsive to the position dependent signal.

15. The apparatus of claim 12, wherein the apparatus further comprises a focussing lens and a Z translation stage to translate the focussing lens to allow focussing of the laser pulse onto the substrate.

16. A method of generating a laser pulse of a desired energy, the method comprising the steps of:
 a) providing a beam of light from a laser source;
 b) directing the beam of light via a modulator, the modulator operable to modulate the beam to produce an output laser pulse;
 c) directing a portion of the output laser pulse to a detector and thereby determining the energy of the output laser pulse;
 d) controlling the modulator so as to switch off the output laser pulse when the determined energy of the output laser pulse reaches a threshold value; and
 e) controlling the cavity length of the laser source responsive to deviation of a measured output laser pulse power from a predetermined desired output laser pulse power.

* * * * *